Figure 1:
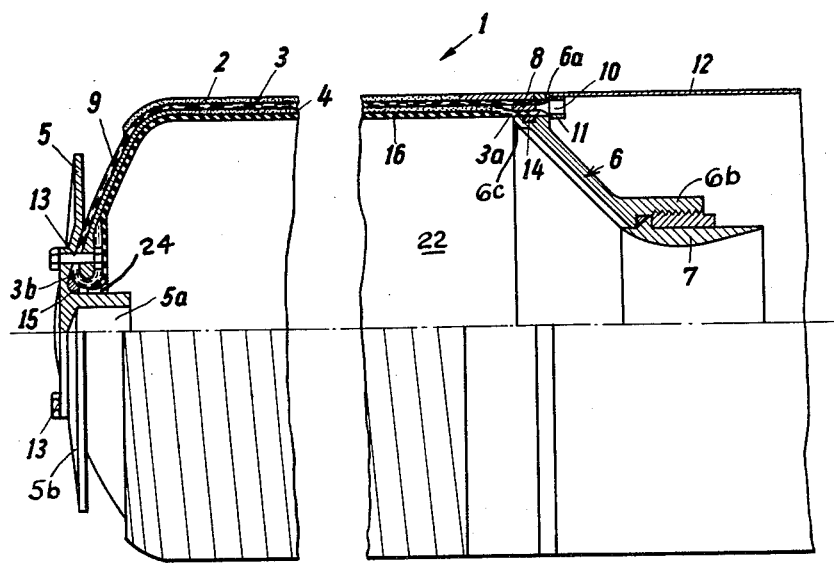

March 9, 1965   H. BOEK   3,172,252
PRESSURE VESSELS
Filed Dec. 19, 1960

Inventor:
HELMUT BOEK
McGlew and Toren

United States Patent Office 3,172,252
Patented Mar. 9, 1965

3,172,252
PRESSURE VESSELS
Helmut Boek, Ottobrunn, near Munich, Germany,
assignor to Bölkow-Entwicklungen Kommandit-
gesellschaft, Ottobrunn, near Munich, Germany
Filed Dec. 19, 1960, Ser. No. 76,563
Claims priority, application Germany, Dec. 19, 1959,
B 55,989
5 Claims. (Cl. 60—35.6)

This invention relates in general to pressure vessels and in particular to a new and useful pressure vessel wall and end closure construction.

The invention has particular application where the vessel is to be employed with pressurized substances therein, including such substances as liquids and gases under pressure, as well as solids which liberate or evolve gas.

The invention has application, for example, where the vessel is employed as a container forming a combustion chamber of an aircraft or flying body and where the vessel is adapted to be formed as a portion of the fuselage or body of such craft. It is important with pressure vessels of this type that the structural materials employed withstand very high temperatures and stresses which act both circumferentially and longitudinally.

Prior art constructions have been made where the material forming the vessel is uniform throughout the thickness and made of great thickness in order to withstand the stresses within the vessel. In the prior art constructions the end closures of such vessels usually comprise flange extensions or neck extensions which are provided with closing lids which are either threaded, cemented or bolted thereto.

A disadvantage in such constructions is that the flange or neck extension required provides an elongated area of reduced dimension which may not be desirable where the use of the vessel requires that the inlet or outlet thereto be approximately the same diameter as the body member. This applies particularly to those instances where the container is used for receiving solid materials, such as, for example, a container which serves as a combustion chamber for solid fuel rocket engines, in which case the openings should be as wide as possible.

In some instances pressure vessels have been provided in which the closure tail piece or head member is secured to the body portion by means of adhesive or cement or in some instances by a combination of cement-adhesive and bolted connections. A disadvantage of the cemented connection is that the latter do not usually withstand the shearing stresses thereon. A disadvantage in the combined use of cementing and bolting is that sealing is difficult and if the vessel is subject to high temperatures the adhesive or cement in many instances breaks down. In some instances in order to prevent the breakdown of the adhesive and resultant leakage, it is necessary to insulate the areas adjacent the adhesive or cement so that it will not be exposed to heat. This, of course, complicates the construction and makes it more expensive. In addition, the last mentioned construction is relatively heavy and not suitable for containers to be used in an aircraft.

In accordance with the present invention, there is provided an improved pressure vessel construction in which the body portion is formed by successive layers which include fibers, such as glass fibers, which are oriented at approximately right angles to each other in successive layers of the material. The container advantageously includes a fibrous body member which comprises fibers in at least one layer which are oriented in directions extending circumferentially around the container, fibers in a next outer layer which are oriented in directions longitudinally along the length of the container and other fibers in another layer which again are oriented circumferentially and so on. The individual sheets of fibers are bonded together by resins or similar materials to form a strong and permanent wall structure.

The closure or head of the container advantageously consists of another material, such as, for example, metal, and the container advantageously includes a closure construction at one end in which the laminates of fiber materials or at least the outer sheet of such fiber materials is bent around a curved end of an annular member having a central opening. The closure member itself has a central inwardly extending flange portion which is positioned in the opening of the annular member. The closure head also includes an outer plate portion which is curved complementary to the curvature of the outer layer of fiber materials at this location. The closure head is fastened in position in the opening by bolts which extend through the annular reinforcing member to clamp the ends of the fibrous material.

A further feature of the invention is the provision of an opposite end construction which in one embodiment includes a frusto-conical metal piece member having an annular tail extension which is secured to a reinforcing ring over which the end of the fibrous material is directed. The securing is such that the frusto-conical member is tightened against the fibrous material by drawing the ring thereto.

In accordance with another feature of the invention an annular ring member is disposed adjacent one end of the vessel and it is provided with a conically sectioned annular groove and a rounded trailing edge over which a layer of fibrous material forming the body portion is directed. This material is then positioned in the annular opening of conical cross-section and wedged therein by suitable means.

The present invention is an improvement over prior art constructions, in accordance with one aspect of the invention, by the provision of a body construction which includes fibrous layers some of which at least have fibers such as glass fibers oriented in an axial direction and thus take up the longitudinal forces acting in the vessel. These layers having longitudinally oriented fibers are formed in a layer such as a layer of resinous material and are locked about a ring-shaped or annular member which is provided with a curved edge for this purpose. The ends of the fibers are clamped to a closure head member which is contoured to closely fit around the fibers and the annular member, the clamping being such that the fibers are clamped between the annular member and the head member.

The opposite end of the vessel is provided with an opening substantially as large as the body of the vessel and this opening is partially filled, in accordance with one embodiment of the invention, by a tail piece which includes a frusto-conical portion and an annular nozzle section. The tail piece is advantageously connected at a series of locations around its periphery by nuts which are threaded on pins which extend from an annular clamping piece. The layer of longitudinally aligned fibers is then wrapped around the clamping piece and the tail piece is drawn close thereto by tightening the nuts of the pins which extend from the clamping piece. A container constructed in this manner is characterized not only by its complete sealing while only requiring small expenditure of structural parts, but also is very low in weight. In addition, the inlet and outlet openings may be formed very large if desired.

In accordance with the preferred application the container itself forms an outer skin of an aircraft in which the container is assembled with its outer wall flush with the outer wall of the remaining body portion of the aircraft. With such a construction it is desirable that the outer skin be devoid of any projecting parts on its circumference, such as, for example, screws, sleeves, collars or other clamping members. In accordance with the present invention it is possible to make the container of this character in which the interior forms a combustion chamber for a rocket engine wherein the combustion chamber jacket forms part of the fuselage of the flying body proper. Thus, in accordance with this invention, the tail piece is secured to the body by means of clamping members which are arranged interiorly of the outer skin of the vessel. In the construction the tail piece may be secured to the body portion of the vessel by means of threaded members which are tightened in an axial direction and thus none of the clamping portions or elements project beyond the circumference of the container. A feature of the invention is that the clamping is done to the layer of the body portion which includes fibers oriented in longitudinal directions and a tightening of the fibers to the respective head and tail piece members insures the taking up of the longitudinal forces which may act on the body of the vessel and the secure clamping of this fibrous layer in end thereof.

Accordingly it is an object of this invention to provide an improved pressure vessel construction.

A further object of the invention is to provide an improved pressure vessel construction having end closures constructed to insure that liquids or gases under pressure within the vessel do not leak out and are held therein even at high and varying pressures and high temperatures.

A further object of the invention is to provide a pressure vessel construction in which no leakage of any kind can occur even if the body is deformed within permissible stability values.

A further object of the invention is to provide a container having very large end openings but which includes sealing means at these openings which prevent leakage from the vessel.

A further object of the invention is to provide a pressure vessel construction in which the body portion is made up of a series of layers of fibers oriented in different directions in successive layers.

A further object of the invention is to provide a pressure vessel construction in which the body portion of the vessel includes at least one layer of fibers which is oriented in an axial direction and thus take up the longitudinal forces acting within the vessel and in which such layer is placed about a ring-shaped or annular member arranged at an end of the vessel and connected to a closing head member in complementary form-locking engagement in such a manner that the ends of the fibers are clamped.

A further object of the invention is to provide a pressure vessel having means for completely sealing the vessel at one or more openings therein and in which the opening of at least one end thereof may be as large as the maximum internal dimension of the vessel and in which the resultant construction is of very low weight.

A further object of the invention is to provide a pressure vessel having a body made of lightweight fibrous materials arranged in successive layers at least one of such layers having the fibers oriented in a circumferential direction and another having the fibers oriented in a longitudinal direction and in which the outer wall of the container is free of projections and may be employed as a portion of the body of an aircraft.

A further object of the invention is to provide a pressure vessel construction in which one end is closed by a member forming a nozzle of an engine and in which the member is secured to a body portion having an outer smooth surface skin by means of clamping members which are not exposed to the exterior of the vessel beyond the outer skin thereof.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which are illustrated and described prefered embodiments of the invention.

Figure 2:
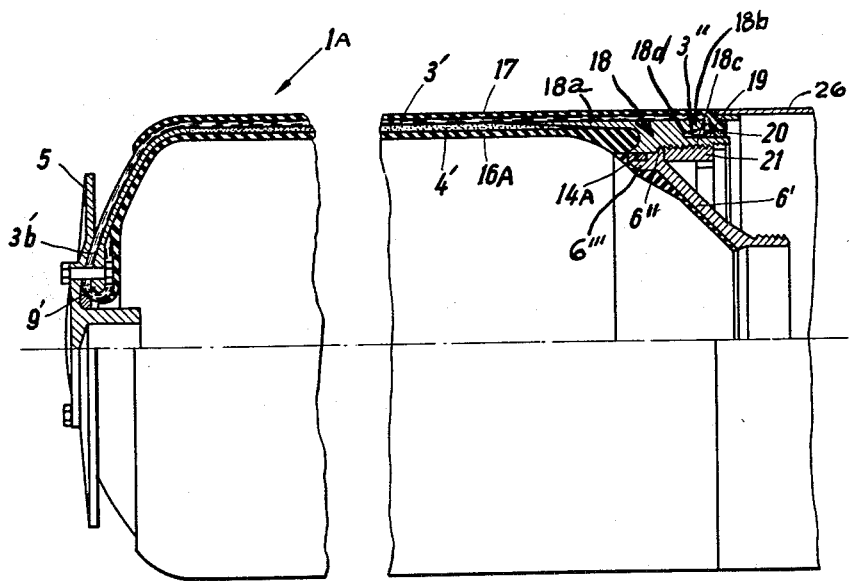

In the drawings:

FIG. 1 is a fragmentary partial elevation and partial transverse section of an aircraft body including a pressure vessel forming a combustion chamber for solid fuel rocket engines constructed in accordance with the invention; and FIG. 2 is a view similar to FIG. 1 of another embodiment of the invention.

Referring to the drawings in particular, the invention embodied therein includes a pressure vessel generally designated 1, which, in the present instance, forms a combustion chamber for a solid-fuel rocket engine and which is mounted on the forward end of the aircraft fuselage or body 12 thereof.

The pressure vessel 1 includes an elongated body portion formed of a plurality of layers of resin bonded fibrous material including an outer layer or winding 2 with fibers which are oriented in circumferential directions of a central combustion chamber 22, a central or middle layer 3 with fibers which are oriented in longitudinal or axial directions and an inner third winding or layer 4 with fibers which are oriented again in circumferential directions.

In some instances it is necessary to have, in addition, an insulating layer 16 which is arranged on the interior of a combustion chamber which is formed within the vessel. The insulating layer 16 is particularly advantageous in the use of the device as a combustion chamber for a solid fuel rocket charge in which case the inner wall surface of the tangentially extending fiber layers would be easily attacked by the high temperatures of the combustion gases. The fibrous layers 2, 3 and 4 advantageously include glass fibers bonded in resinous materials, the glass fibers being chosen because they are particularly suitable for this purpose and they withstand stresses very well.

In accordance with the invention the inner fibrous layer 4 terminates at a spaced location from the end of the body portion and an annular head member 9, of a strong material such as metal, is positioned in alignment with this layer and extends therefrom inwardly in a curve to a central annular opening 24. The annular member 9 is provided with a curved surface around the opening 24 and the fibrous layer 3 having the fibers oriented in a longitudinal direction is directed around this curved portion with its extreme end being disposed directly over the inner face thereof. The fibrous material 3 and the annular plate 9 are thus form-locked together. The outer layer 2 having the circumferentially aligned fibers is advantageously terminated at the location of the body portion 9 where it turns inwardly from the shoulders to the opening 24.

In accordance with the invention a head member or closure member generally designated 5 is provided which includes an annular flange portion 5a which extends into opening 24 and is provided with means for receiving the igniting means (not shown) for the combustion chamber. The head member 5 is provided with an annular plate portion 5b including an inwardly curved section which overlies an end 3b of the fibrous layer 3. The inner face of the plate portion 5b is also provided with a curved annular recess in which is positioned a sealing washer member 15 which bears against the end 3b of the fibrous layer 3. A plurality of bolts 13 are provided in suitable bores disposed around the periphery of the plates 5b and the annular member 9 and they extend through the fibrous layer 3 and the annular member and are tightened to clamp the end portion 3b of the fibrous layer between the member 9 and the head member 5.

The opposite end of the vessel 1 is closed by means of a tail piece member or closing head generally designated 6 which comprises an outer annular outer flange portion 6a and an inner axially extending portion 6b. In accordance with the invention the fibrous layer 3 having the fibers oriented in a longitudinal direction is wrapped around an annular locking member or ring 8, the end 3a thereof lying over an inwardly extending flange or lip portion 6c of the tail piece 6. A plurality of pins 10 extend outwardly from the locking ring 8 at spaced locations around its periphery and through openings provided in the flange portion 6a of the tail piece 6. The locking ring 8 is drawn tightly adjacent the tail piece by tightening nuts 11 on the pins 10 to draw the fibrous material 3 and the tail piece 6 relatively closer together. A sealing ring 14 is provided in a recessed portion of the tail piece flange section 6c to insure that the closure is completely tight and leak proof at such locations. The portion 6b of the tail piece holds a nozzle section 7 for the combustion engine.

The pressure vessel 1 is aligned with the fuselage or body 12 of the aircraft and the outer winding 2, which has fibers which extend in tangential directions, forms an outer portion of the flying jacket proper and thus will lie directly in the air stream during flight. Therefore it is desirable that the container wall be free at its circumference from any projecting members. For this reason, the ring 8 as well as the annular member 9 are located within the layers of the body wall construction and lie out of the air stream and within either the combustion chamber or the fuselage 12.

By employing the clamping screws 10, which extend in an axial direction, as well as the annular clamping piece 8 all within the wall of the flying body fuselage 12 these elements do not interfere with the flying characteristics of the aircraft. Moreover, by the employment of the particular head piece construction and the ring 8 small dimensions may be obtained in a radial direction. The arrangement also permits easy assembly and disassembly of the structure. Moreover when the tail piece 6 is completely removed, the solid fuel rocket charge may be introduced into the combustion chamber without any difficulties. The fuel charge may thus have a diameter which approximates the inner diameter of the combustion chamber and this is very important for effectively charging a combustion chamber for a solid fuel rocket.

In the embodiment indicated in FIG. 2 there is disclosed a combustion chamber generally designated 1A which has a closure at one end identical to that of the embodiment indicated in FIG. 1. The opposite end closure providing a holder for the engine nozzle is somewhat different. The body portion includes in place of the outer layer of fibrous material 2 an outer jacket 17 of synthetic material which forms the outer jacket of an aircraft including a lower fuselage portion 26. Below the outer jacket 17 there is provided a layer 3' comparable to the layer 3 and having fibers oriented in a longitudinal direction. An inner layer 4' includes fibers which are aligned in a circumferential direction. Insulation 16a is provided on the interior of the vessel.

The fiber layer 3' is embedded in synthetic material and connected with the jacket 17 by cementing. In the embodiment indicated in FIG. 2 an annular member generally designated 18 is supported on a flange portion 6''' of a tail piece member generally designated 6'. The annular member 18 includes a longitudinally elongated pointed portion 18a which is embedded between layers 3' and 4', a rounded end portion 18b over which an end 3'' of the layer 3' is directed, and a rearwardly extending cylindrical portion 18c. Between the rounded portion 18b and the cylindrical portion 18c is a frusto-conically sectioned annular groove 18d into which the end 3'' of the fibrous material is inserted. The trailing portion 18c is internally threaded and a locking ring 21 is threaded therein and abuts against a flange portion 6'' of the tail piece 6' to urge it into close engagement with the member 18. A suitable washer member 14a is provided to insure that there will be no leakage at the point of this connection.

The end 3'' of the layer 3' is wedged into the frusto-conical section annular portion 18d by means of a clamping ring 19 which at its inner circumference is guided on the cylindrical projection 18c. The ring is clamped by means of a nut 20 which is threaded onto a threaded outer portion of the rearwardly extending portion 18c. In this manner a secure form-locking connection between the element 18 and the fibers 3' which transmit the longitudinal forces of the vessel is accomplished.

Although the invention has particular application for use as a combustion chamber in an aircraft it may be used in other applications where it is desired to provide a pressure vessel having a minimum of leakage and one in which at least one end thereof may be opened by removal of a cover member substantially the same size as the internal diameter of the vessel. The vessel finds particular application for use in containing liquids or solids which will be at high pressures and high temperatures and in which it is desired to insure that the vessel has a minimum of leakage of the gases or liquids within the container. The construction of the present invention makes any escape or leakage between the closures at each end impossible. This also applies to those situations in which the container is deformed within the permissible stability values. By the inventive construction it is possible to use the container both as a container for liquid, solids or gases.

Thus the invention provides a pressure vessel which has means for securing the ends thereof which prevent leakage therefrom. It is accomplished as in the case with the connection of the tail piece 6 with the annular member 8, a connection which is simple and which does not require many parts and thereby a secure transfer of the longitudinal forces which occur during the firing within the combustion chamber of the rocket fuel is evenly transmitted to the head member 5. Both the connections at the forward and trailing ends of the pressure vessel are simple to make and permit easy assembly and disassembly of the parts.

While specific embodiments of the invention have been shown and described in detail to illustrate the application of the inventive principles, it will be understood that the invention may be embodied otherwise without departing from such principles.

What is claimed is:

1. A combustion chamber having walls made of a plurality of layers of resin bonded fibrous material, and an annular member having a portion disposed between layers of said material and a rounded end portion, means defining an annular frusto-conical groove adjacent said rounded portion and inwardly thereof, said fibrous material having fibers oriented in a longitudinal direction being directed around said rounded portion, and means to wedge said material in said frusto-conical annular groove.

2. A combustion chamber according to claim 1, wherein said means for wedging said material into said groove includes an annular ring and threaded means for displacing said annular ring into said groove.

3. A combustion chamber according to claim 1, including a tail piece member having a frusto-conical portion and a flanged outer end portion disposed in contact with said annular member, said annular member having a threaded portion exterior of said tail piece member and a locking member threadable on said annular member and engageable with said tail piece to force said member into clamping engagement with said annular member.

4. A combustion chamber comprising a body portion formed of a plurality of layers of plastic bonded fiber material with at least one layer including fibers oriented in a longitudinal direction, a relatively thin walled closure ring having an exterior dimension slightly smaller than the exterior of said body portion and an interior dimension slightly greater than the interior of said body portion, the fibrous layer of said body portion having fibers oriented in a longitudinal direction being wrapped around said ring and being substantially flush with the interior of said body, said ring having clamping pins projecting through said fibrous layer in an axial direction, and a tail piece member arranged at the same end of said combustion chamber as said ring and having a vertical flange portion abutting against an end of said fibrous layer and a horizontal flange portion abutting against the inner surface of the portion of said fibrous layer wrapped around and extending within said ring, said tail piece member having openings for receiving the projecting pins for securing said tail piece member to said body.

5. A combustion chamber comprising a body portion formed of a plurality of layers of plastic bonded fiber material with at least one layer including fibers oriented in a longitudinal direction, a relatively thin walled closure ring having an exterior dimension slightly smaller than said body portion, the fibrous layer of said body portion having fibers oriented in a longitudinal direction being wrapped around said ring, said ring having clamping pins projecting through said fibrous layer in an axial direction, a tail piece member arranged at the same end of said combustion chamber as said ring and having a vertical flange portion abutting against an end of said fibrous layer and a horizontal flange portion abutting against the portion of said fibrous layer wrapped around and extending within said ring, said tail piece member having openings for receiving the projecting pins for securing said tail piece member to said body, an annular plate member having a central opening with curved shoulder portions disposed between layers of said plastic material adjacent the opposite end of said combustion chamber from said tail piece, an outer layer of said plastic material having fibers oriented in a longitudinal direction and being directed around the edge of said annular member adjacent the central opening defined therein and backwardly against the interior face thereof, a closure head comprising an inwardly extending annular flange portion positioned in the opening of said annular member and a plate portion contoured to overlie the fibrous material covering the outer face of said annular member, and means to clamp said annular member and said head closure together.

References Cited in the file of this patent
UNITED STATES PATENTS

| | | |
|---|---|---|
| 1,801,910 | Dumat | Apr. 21, 1931 |
| 2,426,526 | Rutishauser et al. | Aug. 26, 1947 |
| 2,744,043 | Ramberg | May 1, 1956 |
| 2,761,279 | Smith | Sept. 4, 1956 |
| 2,791,241 | Reed | May 7, 1957 |
| 2,816,418 | Loedding | Dec. 17, 1957 |
| 2,835,107 | Ward | May 20, 1958 |
| 2,848,133 | Ramberg | Aug. 19, 1958 |
| 2,884,978 | Grimm | May 5, 1959 |
| 2,911,236 | Thibault | Nov. 3, 1959 |
| 2,939,275 | Loedding | June 7, 1960 |
| 3,074,585 | Koontz | Jan. 22, 1963 |